United States Patent [19]

Yaniv et al.

[11] Patent Number: 4,725,890

[45] Date of Patent: Feb. 16, 1988

[54] FLEXIBLE ARRAY OF PHOTOSENSITIVE ELEMENTS

[75] Inventors: Zvi Yaniv, Farmington Hills; Vincent D. Cannella, Birmingham, both of Mich.

[73] Assignee: Ovonic Imaging Systems, Inc., Troy, Mich.

[21] Appl. No.: 886,293

[22] Filed: Jul. 15, 1986

[51] Int. Cl.⁴ ............................................. H04N 1/024
[52] U.S. Cl. ................................... 358/285; 358/292; 358/293; 358/294
[58] Field of Search ............... 358/285, 286, 293, 294, 358/296, 75

[56] References Cited

U.S. PATENT DOCUMENTS

| | | | |
|---|---|---|---|
| 3,225,136 | 12/1965 | Furon | 358/296 |
| 4,275,423 | 6/1981 | Takahashi | 358/285 |
| 4,410,558 | 10/1983 | Izu et al. | 427/39 |
| 4,565,607 | 1/1986 | Hanak et al. | 204/38.1 |
| 4,587,568 | 5/1986 | Takayama | 358/293 |

*Primary Examiner*—Michael A. Masinick
*Attorney, Agent, or Firm*—Marvin S. Siskind; Richard M. Goldman

[57] ABSTRACT

An imaging system including at least one array of discrete photosensitive elements is formed on a flexible substrate so as to read detectable conditions of a non-planar, image bearing surface.

18 Claims, 18 Drawing Figures

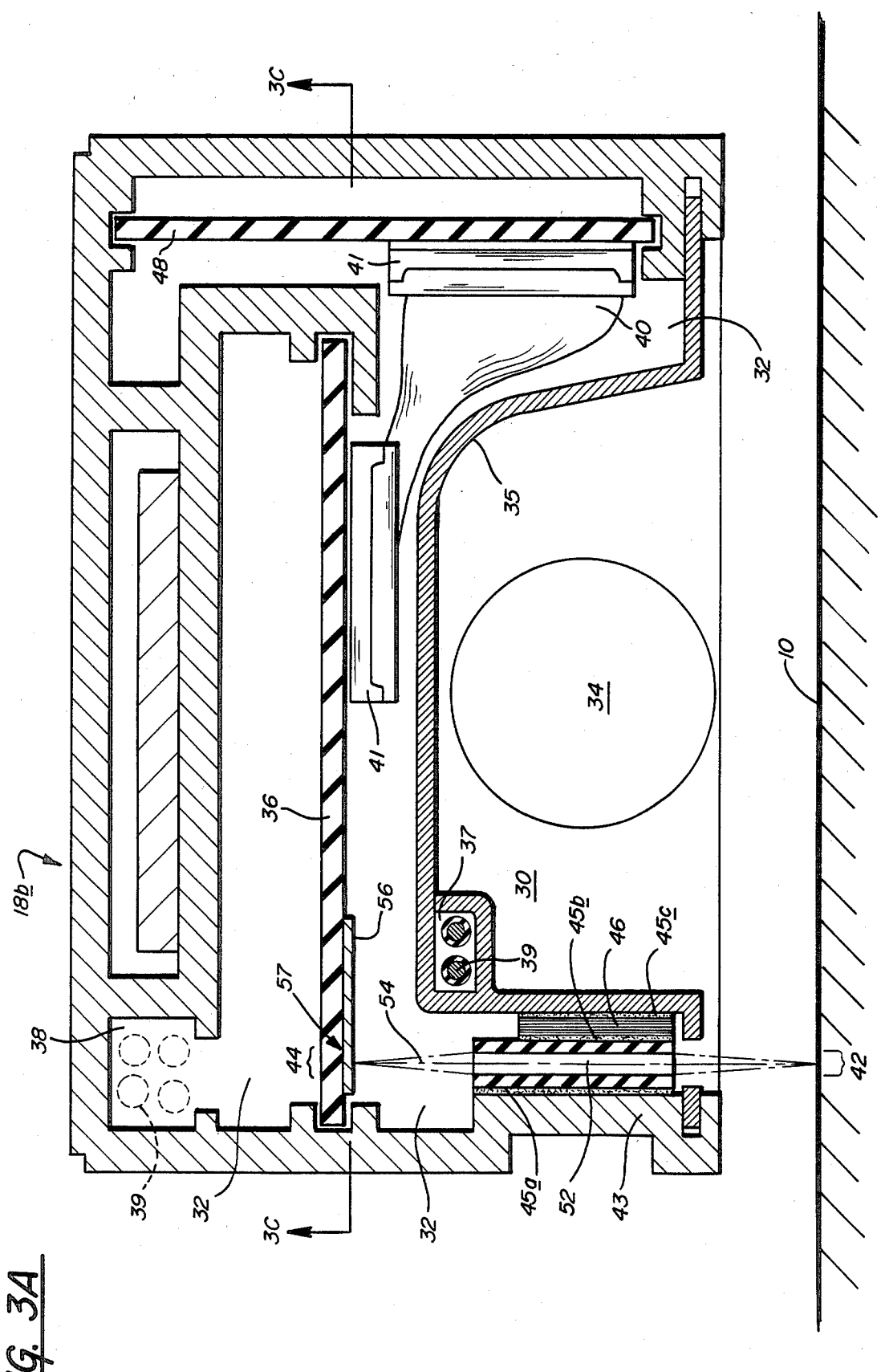

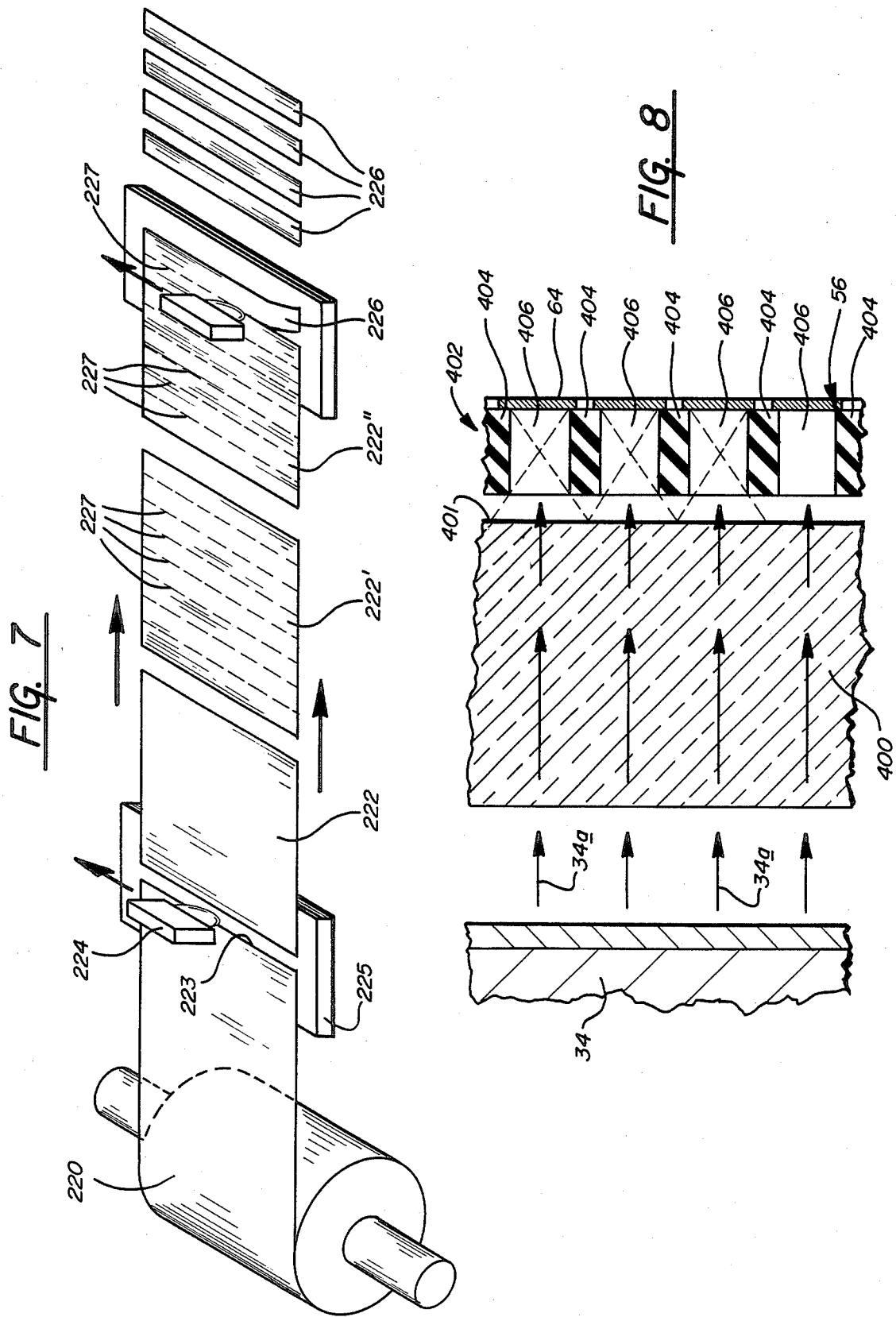

FLEXIBLE ARRAY OF PHOTOSENSITIVE ELEMENTS

FIELD OF THE INVENTION

This invention relates to an imaging system which uses an array of thin film semiconductor photosensors for producing electronic signals representative of the shape and color of an image on, or the visually detectable condition of a surface, such as a planar or contoured white-board surface. In one preferred embodiment, the instant invention relates to a line imaging system for electronic copy boards. As disclosed herein, such systems typically include an elongated linear array of thin film photosensitive elements, said array equal in length to one dimension of the surface to be scanned. In other embodiments, linear and two dimensional sensor arrays are utilized to scan non-planar, or other irregular surfaces. The imaging systems of the instant invention are adapted to produce binary or analog signals corresponding to the images on the surface being scanned, and include means for determining the appropriate threshold value used by each photosensitive element to discriminate between light and dark image points or portions by detecting the brightest point encountered by each element. Because the linear arrays of photosensitive elements of the instant invention are formed on a flexible substrate, the subject arrays can be specifically utilized to follow contoured surfaces or to assume irregular shapes and thereby scan surfaces not readable with the rigid arrays of the prior art.

BACKGROUND OF THE INVENTION

Electronic imaging or scanning systems are commonly used to transform an image from one form, such as a paper original, to an electronic form, such as a digital or analog signal. Once an image is converted to electronic form, many uses of that signal become are possible, including, without limitation, copying of the image onto a piece of paper, projection of the image onto a video display terminal, transmitting the image to a remote location, and subjecting the image to further image processing, such as by a computer, an optical pattern recognition device, or the like.

Line imaging systems typically include a linear array of photosensitive elements, such as photosensors, as well as a light source operatively disposed to provide flood illumination of the surface being scanned. Then either the image on that surface is moved in a direction perpendicular to the longitudinal axis of the sensor array, or the sensor array is moved in a direction perpendicular to the longitudinal axis of that surface so as to scan a stationary image. Since the light reflected from the image-bearing surface varies depending upon the portion of the image being scanned, a darker portion of the image will cause the photosensitive elements to receive less light, while a brighter portion will cause the photosensitive elements to receive more light.

In practice, it has been determined that, due to the inevitable variations in light intensity as well as the variations in the photoresponsive characteristics of individual elements, the signals produced by the reflection of light from areas of the image which are equally bright can be unequal.

It is known in the prior art to compensate for both photosensitive element and illumination non-uniformities of a particular linear array by calibrating the light output data of each element in response to a uniform background image. This accumulated data produces a calibration curve which may be stored in a memory (such as a RAM or a ROM) and then used to compensate the signals sensed elements of the array which combine to form the imaging system. However, because of photosensitive element and light output variability, the calibration curve for a particular linear scanning array can change with time, thereby causing a degradation of the images produced and the need for constant recalibration.

Also known in the art is a scanning apparatus which is adapted to simultaneously sense both the light emanating directly from the source and the light reflected from the scanned image. For each photosensitive element in such an array, a value corresponding to the peak light intensity experienced in scanning the surface is stored; this peak value is then subtracted from the intensity of light previously measured and compared to the reference value. Based upon this comparison, the measured intensity is determined to correspond to either a bright image point or a dark image point. However, such systems are unnecessarily complicated, and require complex electronics.

It is also known in the art to scan surface areas as large as a one meter by two meter copy board by having a movable, white flexible material such as polyester, stretched across and in front of a correspondingly large rigid surface. An image, such as characters or graphics are drawn or otherwise formed upon the surface of the flexible material using, for example black or dark colored erasable markers. Spaced rollers operatively disposed on either distal side of the copyboard are driven in synchronism by a pair of microprocessor controlled stepping motors so as to roll the flexible sheet onto one of the rollers. The image in such systems is scanned under the supervision of a microprocessor control by an array of one or more integrated CCD sensors positioned at a distance of about one meter from the take-up roller. A light source positioned adjacent to the take-up roller and an optical lens system positioned between the take-up roller and CCD array cooperate to project the image onto the CCD. In this manner, a CCD device which may be 25 millimeters or less in linear dimension is capable of scanning the entire surface of the flexible material as the material is being scrolled. Once digitized into electronic form, the image is sent by the microprocessor to a printer which then provides a hard copy of the scanned image. That hard copy generally has been greatly reduced in size compared to the original on the copyboard surface. Such systems typically exhibit fairly low resolution, on the order of 1.0 to 1.5 photosensors or pixels per millimeter or less of original copy, since higher resolution is normally not required for making reduced size copies.

Since the CCD photosensor array and lens system must be spaced relatively far from the linear strip of the image being scanned in order to allow light from the strip to be focused down to the size of the photosensor array, such systems are quite bulky (the copyboard must be thick enough to contain the optical elements). For the same reason, it would not be possible to mount the optical system and CCD sensor array on an elongated movable arm which moves across the stationary image-bearing surface to be copied. Also, since CCDs are quite expensive, it is uneconomical to provide a multitude of integrated CCD photosensitive elements (said photosensitive elements having about two orders of magnitude more resolution than needed) arranged in a large linear array on a movable arm in order to scan a large area image on a stationary board surface to produce a low resolution copy.

In light of the foregoing, it will be readily appreciated that there remains a need for an imaging system which includes a low cost linear array of photosensitive elements, which elements span an elongated linear distance such as one-half meter to one meter or more and which system can be utilized to scan and digitize images on large light-colored surfaces having one or more square meters of surface area. Furthermore, there remains a need for an imaging system including such a linear photosensitive array which provides for such larger image-bearing surfaces to be scanned quickly, efficiently, reliably and in a manner which automatically compensates for variations in image tone, differing individual photo-responsive element characteristics, and changing illumination conditions, such as from the aging (and hence deterioration) of the flood illumination light source.

There also remains a need for a large, low cost linear photosensitive array which features excellent signal-to-noise ratios and the ability to detect relatively light colors (such as low contrast red, light green and light blue) on a white or light colored background surface; as well as darker colors, such as black, brown, dark blue and dark red, on such a light colored background surface.

A further novel feature of the subject invention, which feature finds no response in any prior art, is the fabrication of the linear photoresponsive array on a flexible substrate. In this manner, the flexible photoresponsive array can be used in ways heretofore impossible so as to scan images and conditions on contoured surfaces.

It is desirable, therefore, to provide a simple, inexpensive line imaging system which is capable of compensation, on a substantially instantaneous basis, for variability and changes in illumination intensity as well as instability of photoresponsive element response.

These and many other advantages of the subject invention will become apparent from the drawings, the detailed description and the claims which follow.

BRIEF SUMMARY OF THE INVENTION

There is disclosed herein image scanning apparatus adapted to read detectable conditions of a non-planar, image bearing surface. More particularly, the apparatus of the subject invention is operable to scan images on or the topographical features of a non-planar surface. In order to accomplish such non-planar imaging, the apparatus includes a large area, flexible substrate upon which a large area array of electrically and operationally inerconnected small area photosensitive elements are disposed. The large area array is capable of being urged into a flexed, non-planar condition under the influence of an external bias so as to assume a configuration generally corresponding to the configuration of the non-planar surface to be scanned. The apparatus may be flexed into such a non-planar condition either permanently for use in repetitively imaging a surface, the contour of which remains unchanged; or it may be flexed into such non-planar condition temporarily for use in imaging a surface, the contour of which is subject to periodic change.

Specific shapes into which the image scanning apparatus may be permanently or temporarily flexed include, without limitation, a generally curved configuration and a generally cylindrical configuration. The photosensitive elements include a plurality of layers of generally amorphous semiconductor alloy material of differing conductivity types with a thin film layer of light transmissive, electrically conductive material disposed thereupon. The semiconductor layers and conductive layer form a p-i-n photodiode with the conductive layer serving as the upper electrode therefor. By patterning the electrode, the photodiode is divided up into the large area array of discrete, small area photosensitive elements.

BRIEF DESCRIPTION OF THE DRAWINGS

FIG. 3A is an enlarged cross-sectional view of the sensing arm of the imaging system of FIG. 1 taken along lines 3A—3A of FIG. 2A illustrating one embodiment of an optical and illumination system.

FIG. 7 is a perspective illustration of a preferred method of manufacturing the linear strips and arrays of photosensitive elements shown in FIGS. 5;

FIG. 8 is an enlarged fragmentary cross-sectional side view of one embodiment of a lensless imaging system formed with a linear array of photoresponsive elements adapted for receiving illumination provided by a back-lit translucent board;

DETAILED DESCRIPTION OF THE PREFERRED EMBODIMENTS

Figure 1:
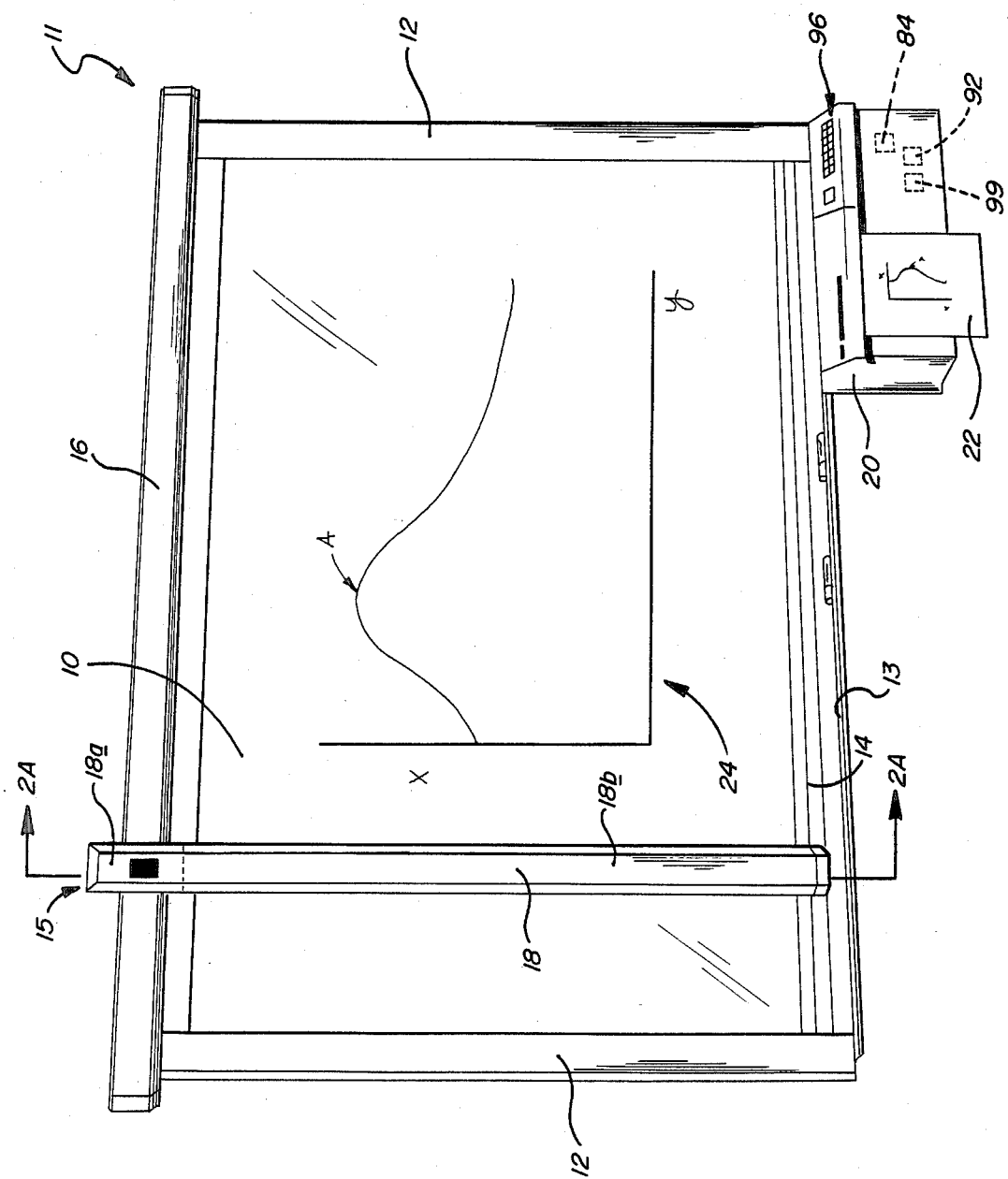
FIG. 1 is a perspective view of one embodiment of the linear imaging system of the present invention illustrating the use of said system in combination with an electronic copy board.

FIG. 1 illustrates one embodiment of the linear imaging system 15 of the present invention, as that system 15 is incorporated into and forms a large area imager for an electronic copy board 16 which includes electronic controlling circuitry and a printer 20. The electronic copy board 11 is sized and configured so as to include a large background surface 10 which is white or of a substantially uniform, preferably light color. The surface 10 is preferably formed of porcelain baked on sheet steel, and may take the form of a white marker board designed for use with erasable, greaseless, colored, felt-tipped marking pens. Such copy boards and marker pens are sold by Quartet Manufacturing Company of Chicago, Ill., among others. Alternatively, a large, relatively smooth, light-colored sheet of paper, piece of cardboard or polyester cloth fastened to a rigid board, table or wall could be utilized as a background surface 10 capable of being image-bearing and being scanned by the linear imaging system of the subject invention.

High resolution embodiments of the line imaging system 15 could be used, for example, on a drafting table in order to digitize manually prepared line drawings and blueprints for input into computer-aided design systems and the like. "High resolution" in this context generally means a sensor density in excess of two photosensitive elements per millimeter, and preferably in the range of four to sixteen photosensors per millimeter. Other embodiments of the subject line imaging system 15, having either high or low resolution as needed, could be used in industrial imaging applications. Such applications may include, by way of example and not limitation, inspection of the surface contour of parts or material such as planar sheets of metal, plaster board, plywood, or continuous webs of thin flat sheet metal stock, fabric or paper, for flaws or defects. The length of the linear array of photosensitive elments, as developed by the subject inventors, can be precisely tailored to suit any of such applications (from several millimeters to several meters in length).

While the following discussion is specifically directed toward the most preferred embodiment of the subject imaging system, as that system is particularly configured and designed to operate with a white or light colored background surface 10 upon which there are created contrasting images, possibly made from black lines or other dark-colored lines, those of even rudimentary skill in the art, after reading the enabling disclosure which follows, will readily be able to adapt this line imaging system to other applications such as those mentioned above. For example, the imaging system 15 can be used with a background surface of virtually any color, including green or black, provided that (1) the symbols or graphics to be scanned (or flaws or defects to be detected) are of a contrasting color, and (2) the signal processing be designed to accommodate the colors of the background and symbols or graphics (or flaws or defects) to be scanned. Further, those skilled in the art will appreciate that it is a simple matter to "reverse" the electronic image so that lines or symbols written on the original in light letters on a dark background may be transmitted and printed as though they were dark points, lines or symbols written on a light background.

As alluded to hereinabove, the instant invention makes it possible for the first time that the portion of surface 10 to be scanned may be of any size, shape or contour. For example, the scannable portion of the rectangularly-shaped copy board surface 10 to be imaged typically has a horizontal dimension of 66 inches (167.6 cm) and a vertical dimension of 44 inches (117.8 cm) or of 33 inches (83.3 cm). A rectangular frame 12 preferably surrounds and supports the perimeter of the surface 10 and can, for example, facilitate mounting surface 10 on a convenient support, such as a wall. The frame 12 may further include a trough or tray 13 for holding small articles, such as erasers and the aforementioned markers. With the foregoing general design parameters in mind, the component elements of the large area copy board which forms the preferred embodiment of the subject invention will be discussed in detail in the subsections which follow.

A. THE IMAGING SYSTEM AND MOUNTINGS

The imaging system 15 includes a relatively thin elongated arm 18, which is preferably comprised of upper and lower housing portions 18a and 18b, respectively, which may be made of any suitable material such as extruded anodized aluminum, formed steel sheet or injection molded plastic. The lower housing portion 18b preferably spans the entire vertical distance betwen upper frame member 16 and lower frame member 14, and contains a light source for illumination, and a linear array of photosensor elements (also referred to interchangeably as image sensors). Arm 128 also may, and preferably does, house the electronics for conditioning signals produced by the imaging system 15, and for comparing the signals against threshold values to determine whether each signal represents a low level or dark image condition or a high level or light image condition. Also, a linear lens structure may be included within or underneath the arm 18 in lower housing portion 18b.

Figure 2A:
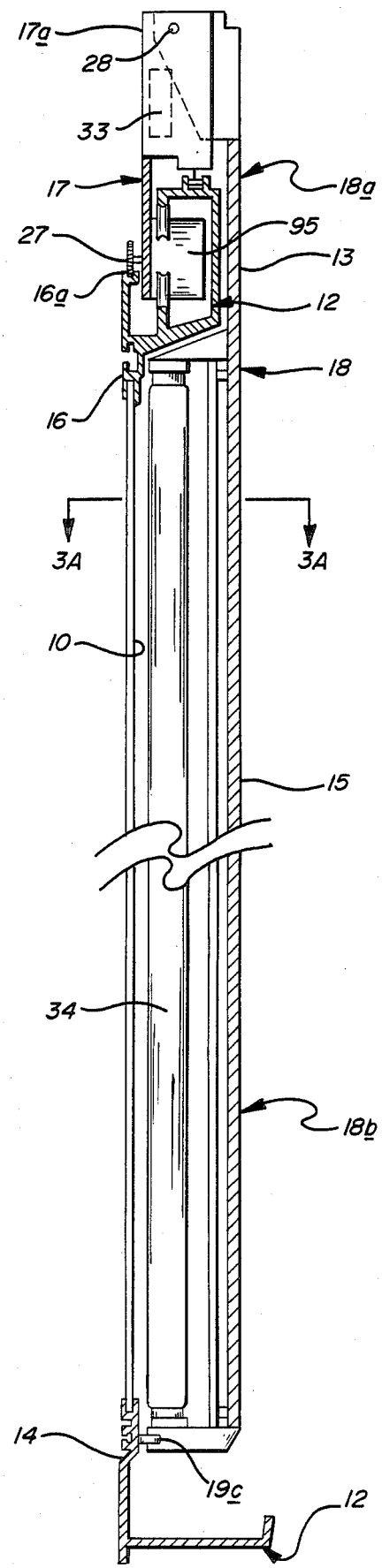
FIG. 2A is a cross-sectional side view of the copy board and sensing arm of the imaging system of the subject invention taken along lines 2A—2A of FIG. 1.
Figure 2B:
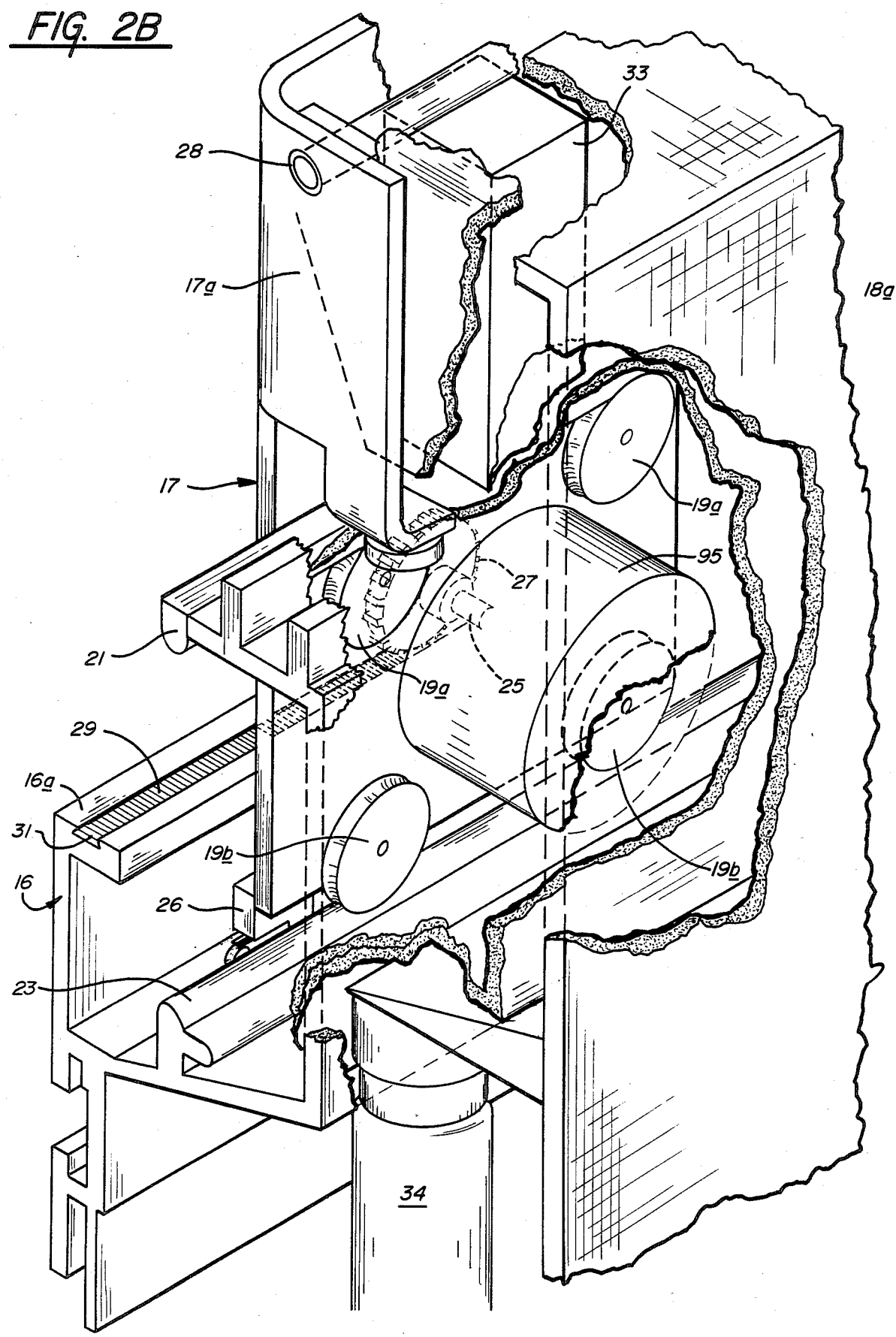
FIG. 2B is a cut-away perspective view of the upper portion of the sensing arm of FIG. 2A showing a multiple wheel trolley and rack-and-pinion drive.

Referring now to FIG. 2A and 2B, the upper housing portion 18a of arm 18 and part of upper frame member 16 are shown in an enlarged cut-away perspective view. Upper housing portion 18a of arm 18 is attached to and supported by a trolley 17 having four wheels 19, which transfer substantially all of the weight of arm 18 to the upper frame member 16. An upper pair of spaced apart wheels 19a bear against and partially envelop an upper track 21, and a lower pair of spaced apart wheels 19b bear against and partially envelope a lower track 23. The tracks 21 and 23 are preferably rounded or otherwise shaped to rollably engage or mate with the complementarily shaped wheels 19. This four-wheeled trolley arrangement serves to prevent jitter or horizontal oscillatory swaying of the arm 18 as it moves across the image-bearing surface 10. In an alternate and preferred embodiment, the trolley 17, may include one or more wheels engagingly contacting the track on the opposite side of rib 21a from the opposite side of wheels 19a so as to still further decrease jitter or swaying. Trolley 17 also preferably includes a drive motor 95 having an axle 25 upon which is mounted a pinion gear 27 that engages a stationary rack attached to or formed on an adjacent surface 16a of upper frame 16. Drive motor 95 could be any suitable motor such as a synchronous two phase or polyphase motor, but is preferably a conventional stepper motor for very uniform speed and precise positioning control.

The rack is preferably formed by a chain 29 that is snugly laid into a groove 31 in the upper frame member 16. The chain 29 may be rigidly positioned by a press fit into the groove, which preferably has a trapezoidal cross-section as shown, or a rectangular cross-section. Alternatively, the chain 19 may be fixed in position by anchoring it at both ends into upper frame member 16 with suitable anchoring means such as pins, screws or other conventional fasteners. The chain 29 can be any suitable chain, but preferably is a stainless steel cable reinforced polyurethane link chain made by Flex-E-Gear Co. For example, a suitable drive chain 29 can be made from a length of Flex-E-Gear 24GCF series chain. The sprocket gear 27 can be a Flex-E-Gear 24B4 series gear, such as Catalog No. 24B4-18. These Flex-E-Gear components are available from Winfred M. Berg, Inc. of East Rockaway, N.Y. As a substitute for a chain, a suitable metal or high strength plastic strip upon which is formed a rack to rollably engage the movable sprocket gear 17 could be positioned snugly in groove 31 or otherwise stationarily anchored in proper position on upper frame 16. Obviously, other drive systems such as a friction drive or cable drive may also be utilized; similarly other arrangements of the track and wheels can be utilized.

The direction of rotation of motor 95 can be reversed, thereby allowing arm 189 to be driven from left to right or from right to left. The electronics for the imaging system 15 allows the linear photosensor array in the arm 18 to be scanned from top to bottom or from bottom to top, as desired. The scanning operation may be started from either the left edge or right edge of the frame 12, so that the image-bearing surface 10 can be scanned left to right or right to left. If only a portion of the surface 10 is to be scanned, the user may, by operating selected control buttons, to be described later, position the arm 18 as desired anywhere along surface 10, and commence scanning there.

Arm 18 is uniformly spaced a predetermined distance away from surface 10. Anchored to the lower end of arm 18 is a roller 19c (shown in FIG. 2A), which is provided to maintain this uniform spaced relationship, and to assist in allowing arm 18 to be moved smoothly across the board. Additional components such as inverter ballast 33, which is electrically connected to and powers the fluorescent tube 34 may be included within the arm 18, if desired. As shown in FIGS. 2A and 2B, the upper arm housing 18a may extend above the trolley to provide room for mounting the ballast there. The ballast 33 preferably operates at a high frequency above 20 kilohertz.

FIGS. 2A and 2B show a preferred construction of a hinge 28 located at the top plate 17a, which extends vertically above the main portion of the trolley frame. The hinge 28 pivotally connects the trolley 17 to the upper arm portion 18a. This pivoting arrangement provides easy access to the face of arm 18 closest to the board surface 10 without disassemblying any part of the arm. The arm is thus free to swing outwardly away from the board surface 10. This makes changing the fluorescent light 34, or cleaning of the external surface of the lens array (described hereinafter) much easier.

Figure 3B:
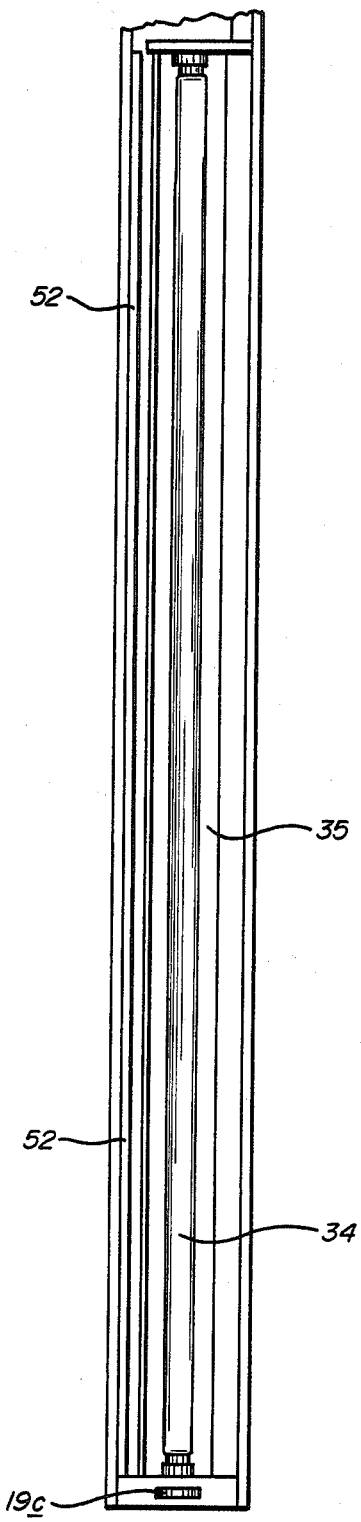
FIG. 3B is a side plan view of the sensing arm shown in FIG. 2A, as seen from the board surface and showing the light source and lens position.

FIG. 3A shows a cross section of arm 18 near the top of lower arm portion 18b as indicated in FIG. 2A. Arm 18 is held in uniformly spaced relation to the surface 10 and includes two chambers, light chamber 30 and photosensor chamber 32. Light chamber 30 is defined by a thin walled U-shaped member 35 extending the full vertical length of lower arm portion 18b as shown in FIG. 2A. The open side of the U-shaped chamber 30 faces surface 10 and contains a suitable linearly arranged light source such as a bank of closely spaced LEDs arranged in a long row (not shown) or preferably a fluorescent tube 34. It is generally preferred that the fluorescent tube 34 is operated at a relatively high frequency such as 20 to 25 kilohertz so that any flickering of its output is at substantially higher rate than the sampling rate of the photosensors to be described below and any sound generated by transformers in the ballast from magnetostructure or other effects is above the range audible to the human ear. Such operation requires a high frequency ballast, such as ballast No. 24RS40E available from the Bodine Company of Collierville, Teen. The fluorescent tube 34 may, for example, be a Sylvania bulp Catalog No. F032/41K, which is four feet long and produces light having a color tempeature of about 4100 degrees Kelvin when used in conjunction with the Bodine ballast. The walls of chamber 30 facing the tube 34 are opaque and preferably have a white diffuse surface.

A-1. THE P.C. BOARDS AND CONNECTIONS THERETO

Figure 3C:
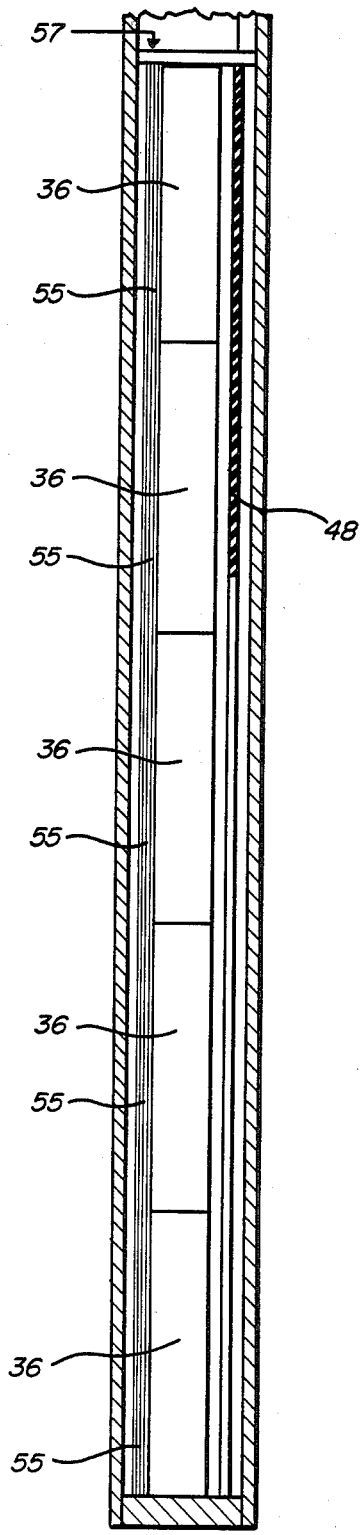
FIG. 3C is a cross-sectional side view of the sensing arm taken along lines 3C—3C of FIG. 3A showing the relative positions of six printed circuit boards within the arm.

The photosensor chamber 32 houses a number of identical printed circuit (PC) boards 36. A linear photosensor array 55, which preferably has 256 individual photosensitive elements arranged in a line, is mounted on each PC board 36. The array 55 may in practice be comprised of a plurality of photosensor strips 56, placed in end-to-end abutment, and each strip 56 preferably contains the same fraction of the total number of individual photosensors in array 55, such as 64 photosensors. The PC boards 36 are placed in end-to-end abutment as illustrated in FIG. 3C, so as to effectively form a single long PC board, and the linear photosensor arrays 55 of PC boards 36 are thus aligned and form a single long photosensor array 57, which vertically spans the readable portion of board surface 10 between upper and lower frame members 14 and 16 shown in FIG. 1. The number of PC boards 36 may be varied, depending upon thelength of each PC board 36, and upon the length of the lower arm portion 18b which corresponds to the vertical distance on surface 10 to be scanned. A single very long PC board which may contain continuous (i.e., unsegmented) integrated photosensor array 57 could be used, if desired for this purpose. It is prtesently more economical, however, to use multiple PC boards 36 and multiple sensor arrays 55 arranged as just described.

For example, in one embodiment, adapted to scan a 44 inch long vertical surface, five PC boards 36 having 256 individual photosensitive elements each are used. In a second embodiment of the imaging system four PC boards each having 320 individual photosensitive elements may be used. In both of these embodiments, there is a total of 1280 individual photosensitive elements in the overall photosensor array 57. The number of said elements is selected to correspond to the number of elements in the thermal head of the printer 20. These two foregoing embodiments are particularly well suited for use as low resolution scanners such as those used for making reduced size copies from a whiteboard. A lesser or greater number of photosensitive elements could clearly be used in sensor array 57, depending on the length to be scanned, resolution requirements and the like.

Referring back to FIG. 3A, the lower housing portion 18b may also be provided with substantially or fully enclosed conduits 37 and 38 adapted to carry power wires 39 used to provide the high frequency high voltage A.C. power required to operate the lamp 34. The walls of the conduits 37 and 38 are preferably made of metal or other material which blocks electromagnetic radiation. The two wires 39 is conduit 37 supply power to the lamp 34. Placing the power wires 39 in these conduits helps to shield the PC boards 36 from other onboard electronics and wire cabling interconnecting them, from electromagnetic radiation, particularly harmonics of the basic A.C. frequency used with the lamp 34. The interconnections between PC boards 36 and other electronbic elements is preferably made by techniques and utilizing hardware known and available to those skilled in the art.

The light incident on each photosensitive element of array 57 is converted into usable electrical signals through the use of electronic circuitry which is preferably located on PC board 36 in reasonably close proximity to the individual sensors. Signals produced by circuitry on PC boards 36 are transmitted to circuitry on another board, for example PC board 48, for further processing to be described later. Signals produced on PC board 48 are then transmitted to the printer or other downstream components located remotely from arm 18.

As can be seen with reference to FIG. 3C, a longitudinal cut-away view of the lower portion 18b of one embodiment of the arm 18 shown in FIG. 2A, five individual PC boards 36 are combined in edge-to-edge abutment so as to effectively create the elongated PC board supporting a photosensor array 57. The linear photosensor array 55 attached to each PC board 36 can be created from one or more photosensor strips, each having a smaller number of individual photosensitive elements.

Figure 4A:
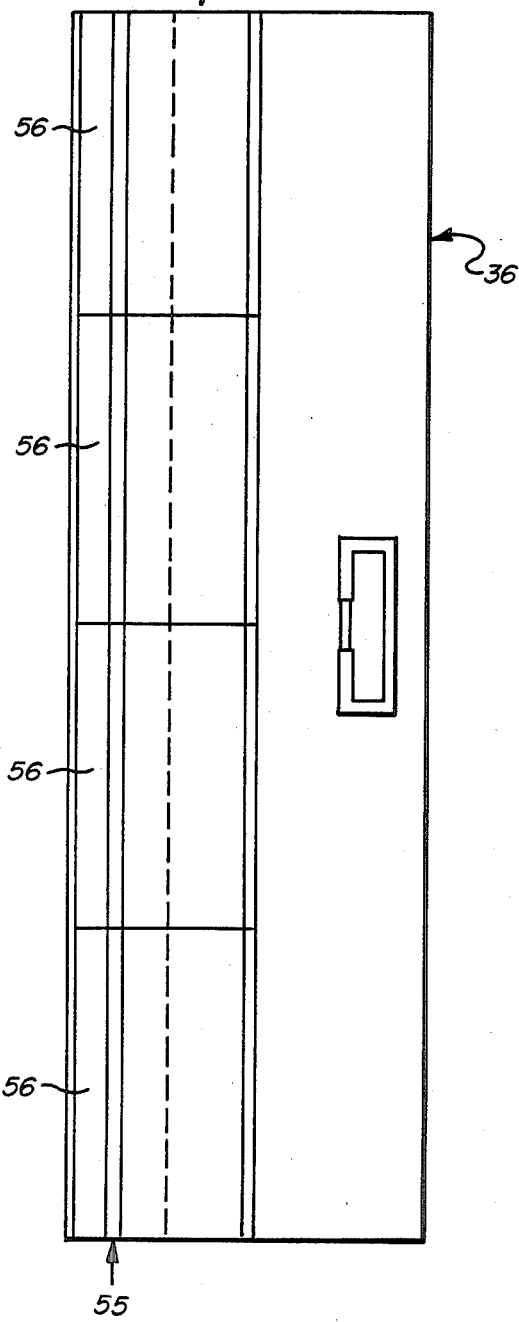
FIG. 4A is a top plan view of one of the five photo-sensor-carrying printed circuit boards, the positions of which are shown in FIG. 3C.
Figure 4B:
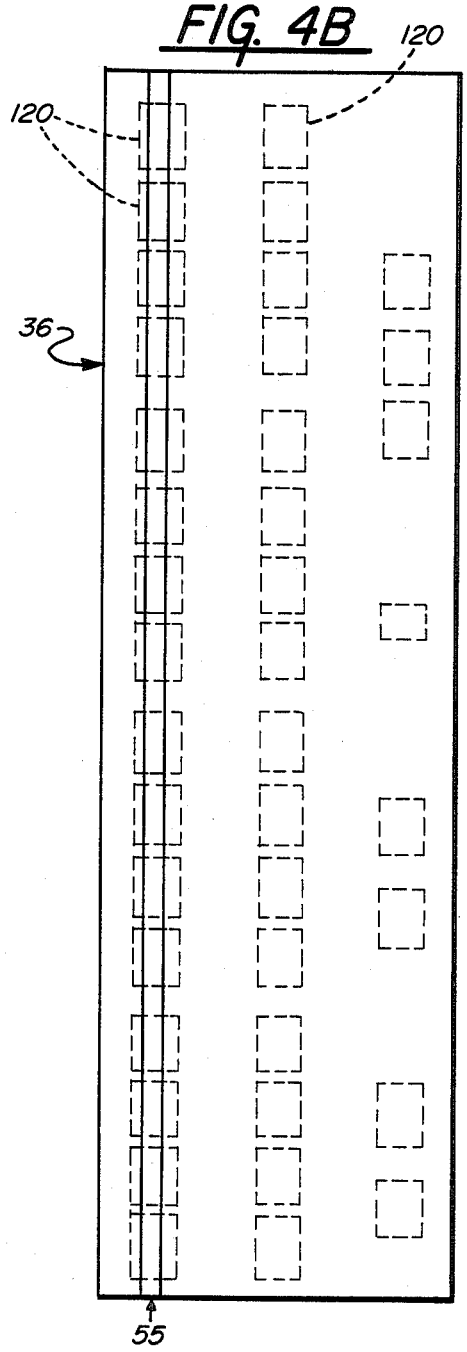
FIG. 4B is a top plan view of the printed circuit boards as in FIG. 4A with the surface mounting elements shown in phantom.

In order to conserve PC board space and thereby minimize the cross-sectional area of the arm 18, the electronic circuitry may be mounted on the side of PC board 36 opposite the photosensor strips 56, and preferably comprises surface mount technology (SMT) components, which are further described by manufacture and part number hereinafter. SMT devices permit greater densities to be achieved on PC boards than is possible with the older dual-in-line packaged integrated circuits. The rectangles shown in dashed lines in FIG. 4B, indicate the relative placement of such SMT integrated circuit devices on a PC board 36 approximately 22.4 cm long and 4.5 cm wide, and having four photosensor strips 56 each having 64 individual photosensitive elements mounted thereon, for a total of 256 photosensitive elements. Even greater packing densities could be achieved, if desired, by using other known methods, such as the use of custom integrated circuits.

A-2. FOCUSING THE IMAGE

Operation of the copyboard will best be understood with reference to FIG. 1. As depicted therein, the arm 18 laterally moves along parallel to surface of the board 10; the linear light source illuminates a small portion of the image 24 and light is reflected from surface 10 according to the local absorption properties of the image 24 and optical characteristics of background surface 10. Portions of the image 24 which are relatively bright reflect a relatively large amount of light, while portions of the image which are relatively dark, reflect very little light.

As shown in FIG. 3A, the light reflected from a long local surface area or strip 42 of the surface of the board 11 is reflected in all directions, including the direction substantially perpendicular to the surface 10 of the board 11. Arranged perpendicularly to the surface 10 is an elongated linear non-inverting imaging lens array 52, for example, a one-to-one magnification ratio lens array produced by Nippon Sheet Glass Company, Ltd. of Tokyo, Japan (Selfoc lens Array, Catalog No. SLA-09). The lens array 52 is a linear array of lenslets each having an optical axix 54 which is operatively disposed with an optical axis perpendicular to surface 10. In addition, the lens array 52 has two focal lines: one focal line appears in the center of the local surface area 42 on the surface of the board 10, while the second focal line falls on the linear area or strip 44 of the linearly arranged photosensor array 57.

The precise width of the area 42 which is viewed for imaging by the array 57, will depend upon the specific Selfoc (TM) Lens selected. In one preferred embodiment, the focal length of each of the focal lines of lens array 52 is about 14 millimeters, and the width of the linear area 42 being imaged is about 0.87 mm. Accordingly, the proper placement of lens array 52 with respect to the surface of the board 10 allows focused images from that area of the board to be sensed. Through use of the appropriate optical system, the individual photosensitive elements of array 57 are each adapted to predominately sense only the light intensity reflected from preselected portions of the area 42 of the surface 10 of the board 11.

Photosensor chamber 32 is preferably configured so that the only light reaching photosensor array 57 is light admitted through lens array 52. The lens array 52 may be attached to side wall 43 of lower housing portion 18b, by any utilitarian method; such as, for example by an adhesive, or double-sided tape 45a. Similar strips of adhesive or tape 45b and 45c may be used to secure an elongated spacer member 46, which serves to close chamber 32 from admitting light. Spacer member 46 may be made from any suitable material, including foam rubber.

A-3. STRIP OF PHOTOSENSITIVE ELEMENTS

Figure 5A:
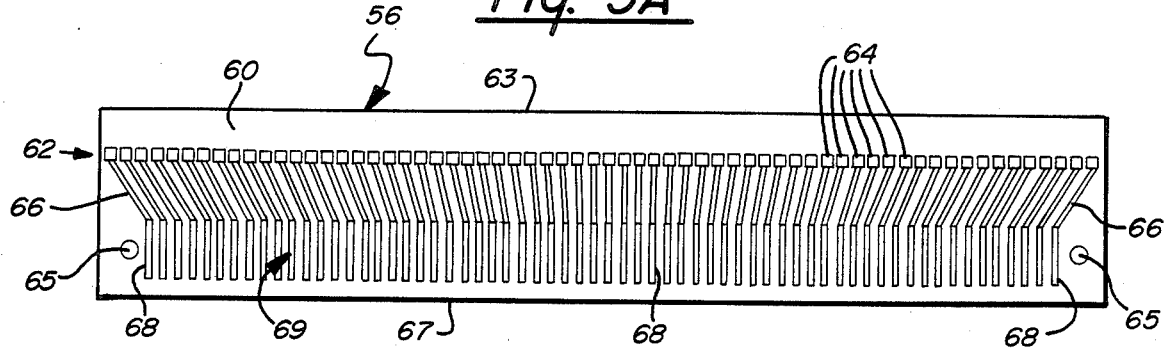
FIG. 5A is a top plan view of a strip of the sensing arm having 64 photosensitive elements operatively disposed thereupon.

FIG. 5A is a plan view of one embodiment of one photosensor strip 56. The strip 56 includes a linear array 62 of individual photosensitive elements 64, which may be, and preferably are rectangular in shape and disposed toward one edge 63 of photosensor strip 56. The individual elements 64 may be given other geometrical shapes if desired. The photosensor strip 56 preferably also includes a conductive trace portion 66 and a conductive contact pad portion 68 for each respective photosensitive element 64. The trace portion 66 and contact pad portion 68 are disposed so as to allow for electrical contact with the photosensitive elements 64, while preventing shadowing or other interference therewith.

In the embodiment of the imaging system having a 44 inch (112 cm) long photosensitive array 57, the center-to-center spacing between adjacent elements 64 is preferably about 0.87 millimeters, and the distance separating each element 64 from adjacent elements 64 is preferably about .24 millimeters. The centers of adjacent individual contact pad portions 68 are preferably separated by 0.8 millimeters. This places the contact pads 68 closer together than the photosensitive elements 64, and thus provides room in the corners of the strip 56 for DC common or ground connections, which are typically required if the strip 56 is not provided with a ground or DC common in some other manner.

When photosensor strip 56 is made on a conductive substrate such as stainless steel, grounding can be provided by contacting the side of the substrate opposite the photosensitive elements 64. Preferably, however, the ground or DC common connection is provided to a conductive substrate by passing self-tapping screws through holes in the strip 56 at location 65, or by grinding or etching away any insulative coating which might be present at convenient locations, such as 65, and bonding or soldering a flexible conductor hooked to DC common or ground thereto. Failure to properly ground sensor strip 56 can lead to a degradation in the signal-to-noise ratio of the signals produced by the photosensitive elements 64.

Depending upon the technology used to produce the individual sensor arrays 56, it may be preferably to create arrays 56 having a smaller or large number of photosensitive elements 64. As shown in an enlarged view of a second embodiment in FIG. 5B, this number can, for example, be 64 elements. Four copies of these individual sensor arrays can then be placed in abutment to create a linear array of 256 photosensitive elements.

Figure 5B:
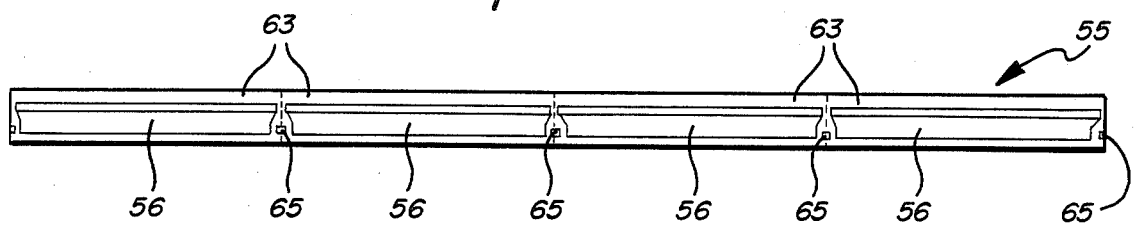
FIG. 5B is a simplifed plan view of a linear array having 256 photosensitive elements arranged as four groups of 64 photosensitive elements of the type shown in FIG. 5A.

FIG. 5B is a second embodiment of the linear sensor array 55 as adapted for PC board 36 use. In this embodiment, all of the sensing elements 64, traces 66 (most of the traces 66 are omitted from the figure for clarity), and contacts 68 are formed on a single substrate whose length is approximately equal to the length of the PC board 36. FIG. 5B shows that even though all 256 photosensitive elements of array 55 are made on a common substrate, they nevertheless can be grouped and interconnected in a manner similar to individual photosensor strips 56. The space between the grouping of contact pads 68 provides room for DC common or grounding contact pads 65, or holes as before, The FIG. 5B embodiment provides substantial economies of scale, because separate assembly of individual sensor strips 56 is rendered unnecessary. However, it also requires more stringent controls on processing of the photosensors since one bad photosensitive elements 64 effectively ruins the entire array 55.

Referring to FIG. 5A reference numeral 69 depicts a discrete pattern, generally formed from an electrically conductive material, a configurational pattern which is adapted and designed to comprise a sensor 64, a trace 66 and a contact pad 68. Each of the individual sensors 64 is preferably rectangular, as shown, with the longer side of the rectangle being transverse to the longitudinal axis of the strip 56 or array 55. The center-to-center spacing between adjacent photosensitive elements 64 is preferably equal to the longer side of a rectangular element. In this manner, each element 64 has a square-shaped effective scan area. In the 44 inch embodiments of the imaging system 15 having 1280 individual photosensitive elements, the center-to-center spacing between adjacent elements is about 870 microns.

The individual photosensitive elements 64 in this embodiment preferably each have a size of about 870 microns by 640 microns, which leaves a gap or space of about 230 microns between adjacent elements.

A-4. THE PHOTOSENSITIVE ELEMENTS

Although the instant invention may be practiced with a number of different types of photosensors, such as photoresistors formed of cadmium sulfide, cadmium selenide, amorphous silicon, amorphous germanium and the like, one particularly useful type of photosensitive element is a photovoltaic element, which produces current and voltage upon illumination. Typically, low dark current, relatively high capacitance, photovoltaic cell structures are preferred. One, such a cell structure is a photodiode which is capable of operating in the fourth or power-generating quadrant of its I-V curve. In fourth quadrant operation of such photovoltaic structures, the amount of charge generated by each photosensitive element during a given frame or time period is directly proportional to the total amount of radiation incident upon that photosensitive element during that period. Accordingly, the relative darkness or lightness of the small portion of image projected onto each element can be determined by measuring or sensing the total integrated charge which has been stored therein. Before explaining the electronic circuitry used to perform this sensing function, it is useful to explain the physical structure of the photosensor strips 56.

Figure 6A:
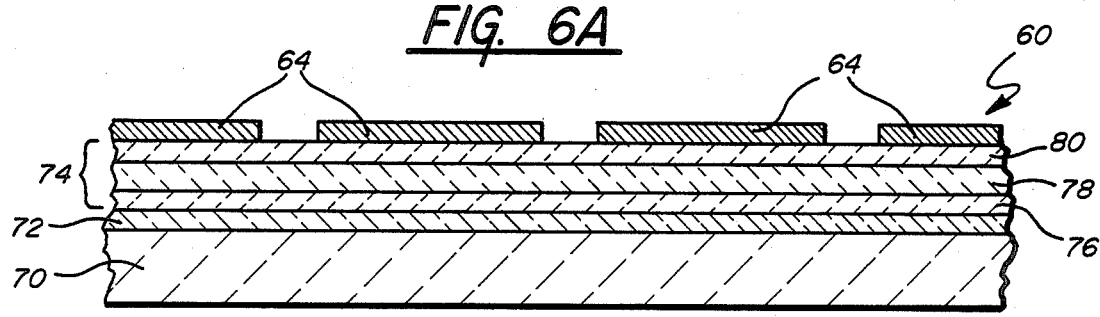
FIG. 6A, 6B and 6C are fragmentary cross-sectional views of various constructions of the layers of amorphous semiconductor alloy material from which the photosensitive elements of the present invention can be fabricated.

FIG. 6A is a cross-sectional view of a portion of one preferred embodiment of photosensor strip 56, comprised of an array of n-i-p type photodiode photosensitive elements 64. The photosensor strip 56 is preferably formed on a conductive substrate 70, which may be stainless steel about 0.007 inches (178 microns) thick, about 0.75 inches (19 mm) wide and about 2.2 inches (55.9 mm) long. Other substrates such as thin metals, or glass, or polymers having an electrically conductive coating thereupon may be similarly employed. Disposed atop the substrate 70 is a reflective layer 72, which may be made of a highly reflective metal such as aluminum, silver or the like and which is approximately 1000 angstroms to 1500 angstroms thick. A very thin layer of chromium (not shown) may also be deposited, if desired, on top of the reflective layer to prevent the back reflector material from diffusing into the subsequently deposited semiconductor layers. It should be noted however, that the use of a back reflector layer is not essential to the photovoltaic operation of the photosensitive elements 64 and accordingly, may be omitted.

Above the reflective layer 72 is a n-i-p multilayered semiconductor diode structure 74, which is preferably formed by the consecutive deposition of continuous layers of n type microcrystalline semiconductor alloy 76, intrinsic amorphous semiconductor alloy 78, and p type microcrystalline semiconductor alloy 80. It should be noted at this point that the terms "n-i-p structure" or "n-i-p diode" are meant to refer to all aggregations of n, i and p layers, without regard to sequence, and is specifically means to include p-i-n as well as n-i-p sequences of layers. Other semiconductor structures such as Schottky barriers, M-I-S devices, N-I-N devices, etc. are applicable with only minor changes to the remainder of the apparatus.

The semiconductor alloy material of layers 76 through 80 is preferably an amorphous alloy of silicon, germanium or germanium and silicon, including at least one density of states reducing element selected from the group consisting of hydrogen and fluorine. As used herein, the term "amorphous" includes all materials or alloys which have long range disorder, although they may have short or intermediate range order, or even contain at times, crystalline inclusions. Also, as used herein, the term "microcrystalline" is defined as a unique class of said amorphous materials characterized by a volume fraction of crystalline inclusions, said volume fraction of inclusions being greater than a threshold value at which the onset of substantial changes in certain key parameters such as electrical conductivity, band gap and absorption constant occurs. The doped layers 76 and 80 may each range in thickness from 50 to 500 angstroms, and preferably each is approximately 100 angstroms thick. Intrinsic layer 78 may range in thickness from 1000 angstroms to 8000 angstroms, and preferably is about 0.6 microns thick.

A continuous layer of transparent, electrically conductive material such as, for example, indium tin oxide (ITO), is next provided atop and in electrical communication with the multilayered diode structure 74. The ITO layer is generally about 600 angstroms thick, although its thickness may be varied as is known to those in the art.

Following deposition of the ITO material, the individual elements are formed by a patterning process. It has generally been found sufficient to merely pattern the ITO in order to form electrically isolated elements, since the lateral resistivity of the underlying semiconductor material is sufficiently high to provide isolation. ITO patterning may be accomplished by any one of many techniques available to those skilled in the art. For example, photoresist techniques may be employed in conjunction with an acidic etchant; alternatively, a silk screen stencil may be utilized to apply a pattern of etchant reagent to the ITO layer. As a result of patterning, the individual photosensitive elements are defined. Additionally, the ITO may be patterned so as to define the traces 66 and contact pads 68 (see FIG. 5A) of the sensor array.

As mentioned previously, processing to remove semiconductor material between individual elements is generally not necessary. Consequently, processing equipment, cost and time are reduced. Since the ITO is significantly more electrically conductive than the underlying semiconductor materials and because the reading of each photosensitive element 64 occurs very quickly, photocurrents created under each rectangular element 64 remain associated with that element and not with adjoining elements. Therefore, the level of cross-talk due to leakage currents is well below the level which could cause a significant degradation in the image.

Figure 6B:
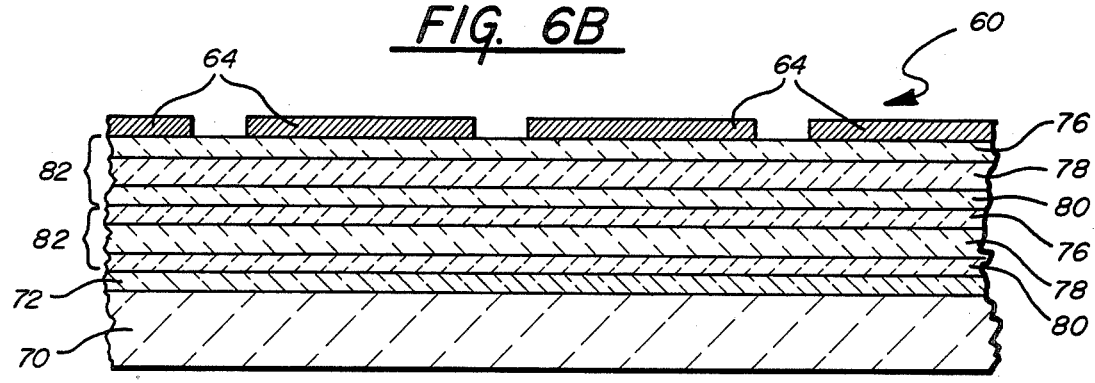

An alternative construction of photosensor strip 56 comprised of stacked, tandem p-i-n photodiodes is shown in FIG. 6B. In this construction, the stainless steel layer 70 is overlaid by the conductive reflector layer 72 as before and additionally two amorphous semiconductor p-i-n diodes 82 are disposed in optical and electrtical series relationship. Each diode 82 is constructed by consecutive deposition of p type semiconductor material 80, intrinsic semiconductor material 78, and n type semiconductor material 76. The thickness of the n and p layers 80 and 76 of diodes 82 may be the same as in diode 74 of FIG. 6A. However, the thickness of the intrinsic layers will generally vary. Since the topmost intrinsic layer is nearest to the source of illumination, it will receive a higher flux of radiation than will the subjacent intrinsic layer. In order to match the photocurrents produced in the two layers, the topmost layer is made thinner than the subjacent layer. The thickness of the intrinsic layer 78 of the upper diode 82 in FIG. 6B is preferably 3000 angstroms, while the thickness of the intrinsic layer 78 of the lower diode 82 in FIG. 6B is preferably 5000 angstroms. Above the semiconductor diode layers 82 is a layer of ITO which is configured as previously described with respect to FIG. 7A, so as to provide the desired element shapes or patterns 69.

Figure 6C:
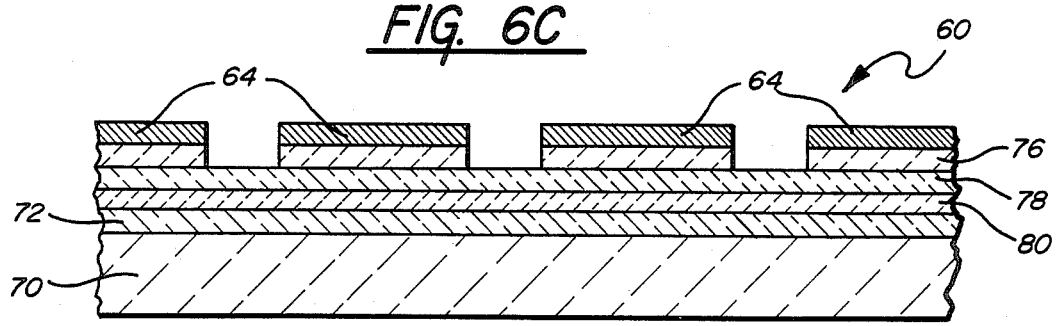

Another configuration of p-i-n type photosensor strip 56 is shown in FIG. 6C. Disposed upon the stainless steel layer 70 and the reflector layer 72 is a p type semiconductor layer 80, intrinsic semiconductor material 78, n type semiconductor material 76, and an ITO layer. Following the deposition of these layers, both the ITO and n type semiconductor layers are patterned so as to produce the photosensitive elements. It has been found advantageous, in some instances, to etch away the n type semiconductor layer since it has significantly higher conductivity than the other layers, and therefore can allow cross-talk between individual photosensitive elements.

Amorphous silicon or germanium alloy semiconductor material is preferably deposited in one or more contiguous layers by plasma-assisted chemical vapor deposition, i.e., glow discharge, as disclosed, for example, in U.S. Pat. No. 4,226,898 which issued on Oct. 7, 1980 in the names of Stanford R. Ovshinsky and Arun Madan, and in U.S. Pat. No. 4,485,389 which issued on Nov. 27, 1984 in the names of Stanford R. Ovshinsky and Masatsugu Izu, the disclosures of which are incorporated herein by reference.

The collection efficiency of the p-i-n diode structures of FIGS. 6A and 6B at one or more ranges of selected wavelengths of incident light may be altered or optimized by intentionally adjusting the band gap and/or thickness of each intrinsic layer 78. Such band gap adjustment techniques are known in the art of amorphous semiconductor solar cell design, and are disclosed, for example, in U.S. Pat. No. 4,342,044 which issued on July 27, 1982 in the names of S. R. Ovshinsky and M. Izu, the disclosure of which is incorporated herein by reference. The collection efficiency for different wavelengths of light can also be optimized by the presence or absence of reflecting layer 72, by varying the thickness of the ITO layer or by utilizing optical filters. In this regard it should be noted that response to IR radiation is particularly desirable and the device can be so tailored for responding thereto.

Although the photosensor strips, arrays and the individual elements are described in FIG. 6 as thin film p-i-n amorphous silicon or germanium alloy semiconductor diode structures, any other thin film photoresponsive devices made from semiconductor materials which may be deposited over large areas or lengths with suitable photoresponsive and electronic characteristics, may be used. Thin film heterojunction photodiodes, Schottky barrier photodiodes or MIS (metal-insulator-semiconductor) type photodiodes may be used, for example. Also, semiconductor materials such as gallium arsenide, cadmium sulfide, copper indium diselenide and other such materials may be employed in the practice of the instant invention.

Although the diode photosensitive elements 64 specifically described herein are preferably operated under forward bias in Quadrant IV of their I-V curve, they and other types of photodiode sensors such as the types described above may be operated in the third quadrant of their I-V curve, wherein they are reverse-biased and utilized to discharge previously charged elements. Techniques and circuitry used for reading such reverse-biased photosensitive elements are well known. Those skilled in the art should appreciate that the electronic circuitry disclosed herein is well-suited for use with photosensors operating in a reverse-biased condition, provided that appropriate modifications are made to those circuit portions closest to the photosensors in order to reverse-bias the photosensors and also in order to obtain unamplified analog signals from them.

A-5. PROCESSING THE PHOTOSENSITIVE MATERIAL

The multilayered solar cell material on a stainless steel substrate of the general type described in FIG. 6 is commercially available from Sovonics Solar Systems, Inc., of Troy, Michigan, where it is made by continuous roll-to-roll processing equipment in 1000 foot rolls nominally 14 inches wide. This material may be purchased with or without an ITO top layer and in either single solar cell or tandem solar cell configurations. Accordingly, when this purchased material is used, it is only necessary to cut the roll into appropriately sized photosensor array strips 55 or 56 and pattern the ITO to form the individual photosensitive elements 64 and their respective traces and contact pads.

One method for manufacturing the linear sensor array 55 shown in FIG. 5B from the aforementioned continuous roll of solar cell material is illustrated in FIG. 7. According to this method, a long roll or continuous web 220 of amorphous silicon solar cell material, is cut into large rectangles 222, using any suitable technique, but preferably by the rear contact methods disclosed in U.S. patent application Ser. No. 718,770 filed Apr. 1, 1985 in the names of P. Nath and A. Singh, and entitled "Method of Severing a Semiconductor Device and Article for Severing," the disclosure of which application is incorporated herein by reference. For ease of illustraton in FIG. 7, the cut 223 is shown as having been made by a mechanical blade shear device 224 drawn transversely across the web of solar cell material while pressed downwardly against resilient base 225 which provides support for the web near the cut. As explained in the aforementioned patent application, it is preferred to palce the transparent conductive layer face down against the resilient base 225, and cut from the substrate side of the continuous web. This helps prevent shards of ITO produced by the severing action from shorting out the solar cell material.

Each resulting rectangle 222 is subjected to patterning or scribing steps which simultaneously produce as indicated on rectangle 222' several sensor strips of the sort shown in FIG. 5B. If rectangle 222' has dimensions of approximately 12 inches by 12 inches, 18 strips, each approximately 11 inches in length and containing 256 individual photosensitive elements 64 can be simultaneously created. After their creation, each of the 18 strips 226 is severed from rectangle 222" to form a sensor strip of the type shown in FIG. 5B.

This severing is done along dotted lines 227 which indicate the longitudinal edges of the strips 226, and preferably does not involve cutting across any of the patterned ITO. The strips 226 are then preferably tested for any internal shorts and for incomplete etching or scribing between the photosensors. After testing, the individual strips 226 are cut to the precise length required for installation onto PC board 36. The longer strips 226 which have one or more bade elements 64, but nevertheless have a sufficient number of consecutive good elements can be cut into one or more smaller strips 56. The ground contact or the mounting holes are preferably made after the strips 226 are tested. However, if desired, these vias or holes can be made before testing, such as part of the etching and scribing steps. Obviously, other sequences of patterning, scribing and severing steps can be utilized.

B. THE LENSELESS SYSTEM

While the foregoing discussion was primarily concerned with an imaging system which utilizes lenses or other optical elements for the conveyance of light from the surface being scanned 10 to a linear array of photosensitive elements 64, the instant invention is obviously not so limited. In many instances, lenses or other optical elements may be completely dispensed with and a simple mask having a plurality of apertures therein, or other such lenseless means, may be employed to restrict and guide light, either transmitted or reflected from the surface being scanned to the corresponding photosensitive elements. It should be noted, that as used herein, the term "light emanating from the surface" is meant to include light emanating from the surface" is meant to include light transmitted through or reflected from the surface being scanned, sid light having an intensity corresponding to the pattern of information on that surface.

Referring now to FIG. 8, there is shown one preferred embodiment of an imaging system structured and operative to be utilized in a lensless fashion. In this instance, the system 402 is depicted as operating in a light transmissive "i.e. backlit" mode. An elongated light source 34 projects a beam of radiation 34a through a transparent sheet 400 upon which the image being scanned is disposed. The sheet 400 absorbs or transmits the incident radiation depending on the presence or absence of an image thereupon. The radiation transmitted therethrough passes to the lensless imager 402 of the instant invention. The lensless imager 402 comprises an array 56 of photoresistive elements, generally similar to those arrays previously described. The component which makes the lensless imager feasible is the apertured mask 404, which functions as an optical element for directing radiation emanating from particular portions of the surface being imaged, in this case the sheet 400, to the corresponding photosensitive elements.

As depicted, the mask 404 is formed of a relatively opaque material, such as printed circuit board material, metals, polymers and the like. The mask includes a plurality of openings 406 therein, each opening optically aligned with a photosensitive element 64 of the array 56. The openings 406 are relatively deep openings, that is to say they have a high depth to diameter ratio and as such function to collimate or otherwise restrict the angle of view of the photosensitive element 64 disposed at the distal end thereof to a relatively narrow portion of the surface 400 being imaged. The dashed lines shown intersecting within various of the openings 406 are indicative of the angle of view of the photosensitive elements as restricted by the mask 404.

It will be noted from a review of FIG. 8, that as the surface being scanned 400 is moved farther away from the mask 404, the area viewed by the individual photosensitive elements will expand and eventually overlap of the adjacent areas can occur. Some degree of such overlap can be tolerated insofar as the electronic circuitry of the instant invention utilizes a weighted, or self-calibrated measurement to determine whether any discrete element 64 is imaging a light or dark area, however, extreme overlap will result in spurious or erroneous signals. Consequently, care must be taken to assure maintenance of proper spacing between the scanner mask 404 and the surface being imaged 400. Such spacing can be assured by utilizing one or more rollers (not shown) which contact, in a biased manner) the surface being scanned and thus maintain proper distance. In other instances, the mask itself may be placed in contact with the image-bearing surface and moved thereacross. In such contact embodiments, a wear plate or other such member may preferably be interposed between the mask 404 and the image-bearing surface 400 so as to eliminate damage to the surface or wear to the mask. It is important to note that the mask, when utilized in a surface contacting embodiment, contacts said surface only after the photosensitive elements have reproduced the image disposed thereupon. By so having the mask-contacting portion (and obviously any rollers) laterally displaced relative to the photosensitive array, the image is not deleteriously smudged and the mask can also be adapted to provide an erasing function.

The light source, is shown as an elongated fluorescent tube 34 oriented so as to back light the surface 40 being scanned. Obviously, other such arrangements may be utilized in conjunction with the instant invention. For example, a front surface illumination system, generally similar to that depicted in FIG. 3A may be advantageously employed. In such an instance, an elongated light source such as a fluorescent tube is mounted within the scanner arm and oriented so as to reflect light from the surface being scanned. In some instances, it may be advantageous to include a lens or other light concentrating or enhancing element in conjunction with the light source, for purposes of directing and more efficiently utilizing light for illumination of the surface. Such embodiments are intended to be within the scope of the instant invention and for purposes of present discussion are considered "lensless" because the sensor array 56 does not utilize optical elements. While fluorescent light sources have been described, other light sources such as a linear array of light emitting diodes may also be utilized to illuminate the surface being scanned.

Various modifications to the aforedescribed system will be readily apparent to one of skill in the art. For example, the openings 406 in the mask 404 may be filled with an optically transparent material, such as a polymeric resin so as to function as fiber optic elements for more efficiently conveying light therethrough. In other instances it may be desirable to provide the interior surface of the openings 406 with a reflective coating to assist in the efficient passage of light therethrough; while in other instances it may be desirable to provide these interior surfaces with a light absorbing coating so as to restrict the angle of view of the photosensitive elements 64 and thereby prevent collection of spurious light. In other instances, it may be desirable to include a plurality of masks in aligned relationship to further collimate and collect light emanating from the surface being scanned. These masks may be of differing diameters so as to form a tapering optical path thereby providing a still further restricted angle of view for the discrete photosensitive elements.

These, as well as other variations in the lenseless optical system should be readily apparent to one of skill in the optical arts and need not be elaborated upon in greater detail herein, it being kept in mind that the instant invention is meant to specifically include a lensless optical system for directing light from particular portions of a surface being scanned 400 onto corresponding photosensitive elements 64, said mask 402 necessarily being maintained in elatively close proximity to said surface.

C. THE PRINTER AND RELATED CONTROLS

The electronic copy board 11 may further include a printer 20 which, when fed the appropriate signals originating from arm 18, produces a copy 22 of the original image 24 placed on surface 10. As shown in FIG. 1, the copy 22 is preferably a reproduction of the original image 24 which is substantially reduced in size. It has been found that low resolution line imagers, i.e., line imagers having a resolution of two photosensors or pixels per millimeter or less, are quite acceptable for such applications. Printer 20 can be any convenient form of printer, such as one using thermally sensitive paper. One suitable thermal printer for making reduced size copies is Model No. HZ-1X01-PM made by Sharp Electronics Co. Ltd. of Japan which prints a line, consisting of up to 1280 dots, on letter size paper (e.g., paper about 21.5 cm wide by about 27.8 cm to 35.5 cm long) at a horizontal resolution of six dots/mm and a vertical resolution of six lines/mm. Oter types of printers such as dot matrix, ink jet or laser printers may be similarly employed.

The electrical connections between the arm 18, the electronic controller 84 and printer 20 shown in the bottom right hand corner of FIG. 1 may be provided in any suitable fashion, but are preferably made with conventional flat ribbon power and electronic cables (not shown) designed for flexing service and preferably with suitable strain-resistant electrical connections for at least the trolley end thereof. These cables are laid within and at least partially along the length of enclosed chamber defined by the framework of the copy board 11.

If desired, the data signals from arm 18 may be temporarily stored for later processing or printing, or may be printed concurrently with the scanning motion of the arm, as will be described later. Printer 20 may be located remotely from the copy board surface 10, provided suitable electrical interconnections are established between the arm and printer. The interconnections may take the form of a conventional, flexible, curled, multi-conductor electrical cable 217 with conventional connectors at the ends thereof as shown in FIG. 12A, an infra-red data link or the like.

D. SCOPE OF DISCLOSURE

While the instant invention has primarily been described heretofore with reference to the scanning or imaging of a planar surface such as a copy board, the instant invention is not so limited. As mentioned previously, other planar and non-planar surfaces such as the planar contoured surfaces of textiles, newsprint, plywood and the like may be also scanned without departing from the spirit or scope of this invention. Scanning of the surface may be for purposes of reproducing the images or data found thereupon, or scanning of the surface may be for purposes of detecting flaws or irregularities in that surface. Therefore, in the broadest sense, the instant invention provides the electronic reproduction of various patterns of information or other indicia or features which are formed or otherwise detectable upon a surface to be scanned. This pattern may be compared with a stored pattern for later processing. For example, data corresponding to the pattern of textiles and the like may be stored in memory and compared with a pattern of data generated by scanning replications of those textiles so as to detect any flaws therein.

It is a notable feature of the instant invention that the arrays of photosensitive elements formed upon flexible substrates such as polymeric materials or thin metallic materials may be utilized to form flexible sensor arrays. Such flexible arrays may be readily utilized to scan non-planar, or other irregular surfaces as will be described in further detail hereinbelow. In light of the foregoing, it should be kept in mind that whenever "scanning" of surfaces is discussed herein, that term is meant to include the scanning of planar as well as non-planar and regularly shaped as well as irregularly shaped surfaces.

The diametric arm 18″ is held by, and rides in, a circumferential track 300, generally similar in structure and function to the track of the FIG. 14A embodiment. The arm 18″ may include a single drive motor disposed at one end thereof and engaging the track 300″ and an idler roller at the other end thereof also in engagement with the track. In other embodiments, the arm 18″ may include two drive motors.

E. THE FLEXIBLE SUBSTRATE SCANNER AND THE SCANNING OF NON-PLANAR SURFACES AND SURFACE CONDITIONS

Figure 11:
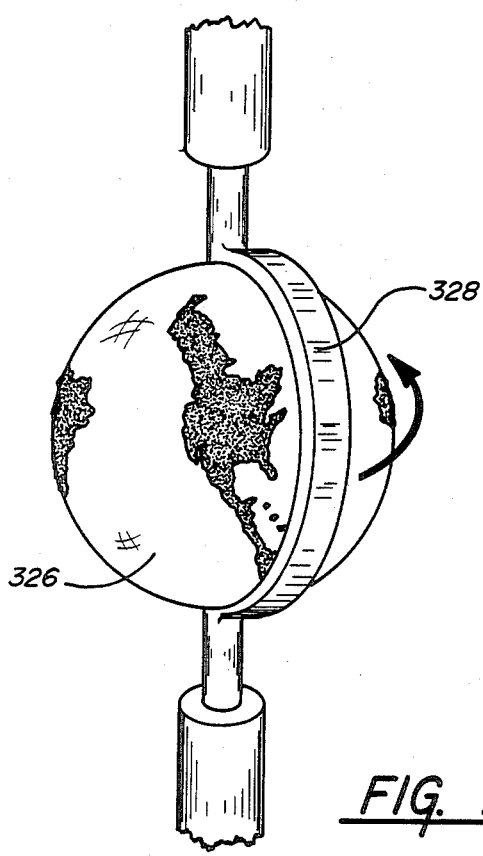
FIG. 11 is a perspective, cut-away view of a flexible scanner array of the photosensitive elements of the instant invention as that array is opperatively disposed to image or inspect the surface of a sphere.
Figure 9:
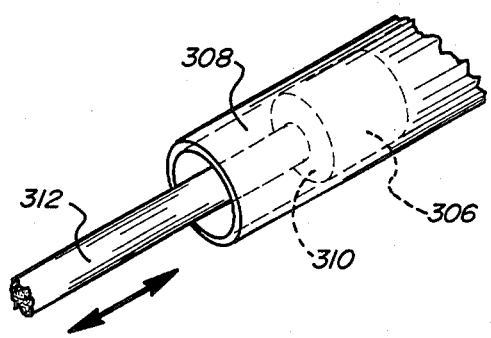
FIG. 9 is a perspective view of a flexible scanner array of the photosensitive elements of the instant invention as that array is operatively disposed to image or inspect the interior surface of a cylindrical pipe.
Figure 10:
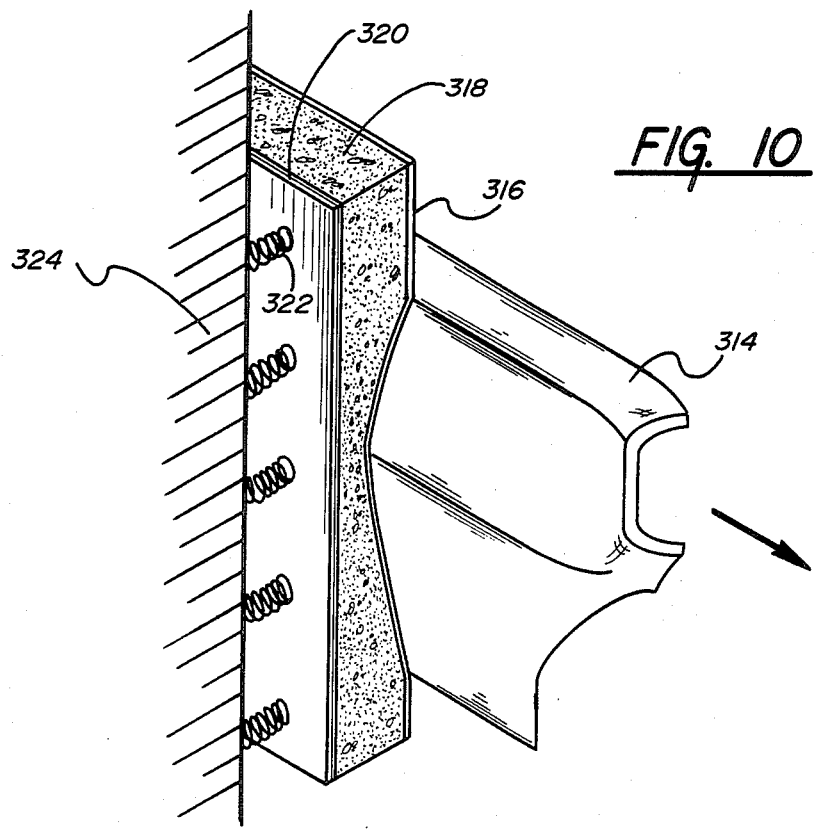
FIG. 10 is a perspective, cut-away view of a flexible scanner array of the photosensitive elements of the instant invention as that array is operatively disposed to image or inspect an irregular surface, such as the surface for automobile body panel.

The fact that the scanning system of the instant invention may include photosensor arrays disposed upon flexible substrates greatly expands the utility and applications of the instant invention. Use of a flexible substrate photosensor array allows for conformal contact with a wide variety of differently shaped surfaces, including planar surfaces having irregular outlines as well as non-planar surfaces. FIGS. 9-11 depict several embodiments of the instant invention in which the flexibility of the photosensor array is utilized to provide for scanning of curved, irregular or other non-planar surfaces.

Referring now to FIG. 9, there is shown a flexible photosensor array 306 of the instant invention as adapted to scan the cylindrical interior surface of a pipe 308, as for example to inspect for flaws, corrosion and so forth. The scanner array of this embodiment 306, is disposed about the outer periphery of a mandrel 310 having a cross section approximately equal to that of the pipe 308 being inspected. The photosensor array 306, is generally similar to the previously described arrays, and the mandrel 310, is generally analagous to the previously described scanning arm and thus may include a light source and optical system therein as previously described for illuminating the surface of the pipe 308 being scanned. In those instances, where the pipe 308 is a transparent tube, such as a plastic or glass tube, a mandrel borne light source may not be needed, sufficient illumination being provided by passage of light therethrough in a back-lit mode of operation.

In operation, the mandrel 310 bearing the flexible, cylindrical photosensor 36 is advanced through the tube 308 by an arm 312, which can also serve to form a conduit for carrying electrical signals.

FIG. 10 depicts a flexible scanning array of the instant invention as adapted to scan an irregular surface such as automotive body panel 314, so as to detect flaws thereupon. In the embodiment of FIG. 11, a flexible photosensor array is disposed upon a substrate 316 which is generally conformable to the shape, in this case the body panel 314, being scanned. The substrate 316, may be a polymeric or metallic substrate. In some instances, it may be desirable to preform the substrate 316 to approximately correspond to the surface being scanned, whereas in instances where the contour is not to extreme, the substrate 316 and the scanner may be deformably contacted to the surface.

The photosensor elements and the associated electronics are generally similar to those previously described and will not be elaborated upon further except to note that when adapted for 2-D scanning, a plurality of linear sensor arrays may be disposed in side by side relationship, so as to allow for scanning without the need for relative motion of the sensor and surface. As illustrated in this embodiment, the substrate 316, bearing the photosensor elements thereupon is backed by a resilient body of material 318 such as, a body of foam rubber, polyurethane, or other such supple polymeric material. Additionally, in order to still further facilitate flexible contact of the photosensors to the irregularly shaped object being scanned, the resilient body 318 is backed with a mounting plate 320, affixed to a rigid surface 324 by a plurality of springs 322, rubber blocks or other such coupling members. Although not shown, the photosensors of the embodiment of FIG. 11 may include a wear resistant sheet, such as a sheet of teflon or other such lubricious material disposed thereupon so as to prevent abrasive damage to either the sensors or the surface being scanned. In order to still further minimize wear of the scanner and abrasive damage to the surface being scanned, it may be desirable to space the scanner from the surface. Such spacing may be accomplished by the use of air bearings, mechanic bearings or rollers as previously described, or by another technique known to those of kill in the art. Additionally, when such a spaced apart arrangement is employed, introduction of illumination is facilitated.

In operation, the scanner surface and the object being inspected are moved relative to one another. Typically, the objects, such as the body panel 314 will be moved past the scanner surface at an inspection station, and the flexible photosensor scanner array will produce an electronic signal corresponding to the surface being scanned. This signal may be utilized to indicate the presence of defects thereupon, and through the use of the appropriate software and apparatus, defective parts may be removed from the production line or defect curing procedures may be implemented to remove particular flaws. It is notable that the scanning array of the instant invention not only identifies defective parts but is capable of giving a positional location of the defects so as to enable the ready cure thereof.

The FIG. 11 embodiment of the instant invention utilizes the ability of flexible photosensor arrays of the instant invention to scan a curved surface. Shown in FIG. 11 is an inspection system as particularly adapted for scanning data or patterns upon a spherical surface, in this case the surface of an earth globe. Such scanning may be utilized in a production line to inspect the globes for defects. Alternatively, the system may be used to make two dimensional depictions of a spherical surface. Obviously, an embodiment of this type may also be utilized to inspect other spherical objects.

As depicted, the globe 326 is disposed in close proximity to a curved scanning arm 328, which is generally similar to the scanning arm 18, of the foregoing description. The curved arm 328 includes a curved array of photosensor elements, and may optionally include a light source. In operation, the globe 326, and the arm 328 are moved negative to one another, by either rotating the globe 326, the arm 328 or both. In this manner, scanning is accomplished as in the previously described embodiments. Obviously, other configurations of the scanning arm 328 may be utilized to take advantage of the flexibility of the photosensitive elements. For example, the array may be formed as a strip in a spherical on hemispherical cavity and the globe 326 may be rotated therein for scanning. Other such variations should be readily apparent to one of skill in the art.

Many variations of the foregoing embodiments of the instant invention should be readily apparent to one of skill in the art. A great variety of scanner devices may be manufactured in light of the fact that photosensor arrays having preselected spectral responses and gray scale responses may be formed upon a variety of substrates. Through the use of appropriate photosensitive materials and device configurations, sensors having gray scale and color reproduction capabilities can be provided. The electronic circuitry disclosed herein will also find utility in a variety of imaging, as well as other electronic applications.

While specific preferred embodiments of the present invention have been described in detail, it will be appreciated that the invention is susceptible to modification, variation and change without departing from the spirit or scope of the present invention, which is to be limited only by the following claims.

What is claimed:

1. An image scanning device including, in combination:
    a non-planar surface having features to be scanned;
    a large area, flexible substrate;
    a large area array of discrete, small area, thin film photosensitive elements electrically and operationally interconnected; said array disposed upon said substrate;
    biasing means;
    said large area array operatively flexed by said biasing means into a condition generally corresponding to at least the general overall contour of the non-planar surface to be scanned.

2. A device as in claim 1, wherein the array is permanently flexed into a preselected non-planar configuration.

3. A device as in claim 1, wherein said biasing means is adapted to flex said array from an equilibrium condition into a desired non-planar condition.

4. A device as in claim 2, wherein the array is permanently flexed into a generally curved configuration.

5. A device as in claim 3, wherein the array is permanently flexed into a generally cylindrically shaped configuration.

6. A device as in claim 3, wherein the array is permanently flexed into a preselected configuration which includes an irregular nonsymmetrical shape.

7. A device as in claim 3, wherein the biasing means is adapted to urge the array against said surface to be scanned.

8. A device as in claim 7, wherein the biasing means operatively cooperates with the array so as to alter the configuration of the array to conform said array to the configuration of the surface to be scanned.

9. A device as in claim 1, wherein said array is curved and the surface to be scanned is spherically shaped.

10. A device as in claim 1, wherein said array is cylindrically shaped and the surface to be scanned is the interior of a tubular cavity.

11. A device as in claim 1, wherein the array includes a body of surface-contacting material, said body forming a non-abrasive, deformable mask for preventing spurious radiation from impinging on the discrete photosensitive elements.

12. A device as in claim 11, wherein the mask is lubricious.

13. A device as in claim 1, wherein each of the photosensitive elements define a photodiode.

14. A device as in claim 12, wherein the photodiode operates by charging an uncharged element with photogenerated current and measuring the resultant voltage or current.

15. A device as in claim 12, wherein the photodiode operates by discharging an externally imposed charge and measuring the decrease in voltage or current.

16. A device as in claim 15, wherein the photodiode is formed by a plurality of layers of semiconductor alloy material and an upper electrode.

17. A device as in claim 16, wherein the layers of semiconductor alloy material define a p-i-n diode.

18. A device as in claim 16, wherein the upper electrode material is selectively etched to define the size and shape of the discrete photosensitive elements.

* * * * *